US 6,590,841 B2

(12) United States Patent
Ostwald

(10) Patent No.: US 6,590,841 B2
(45) Date of Patent: *Jul. 8, 2003

(54) SMALL LIBRARY WORKS-IN-A-DRAWER

(75) Inventor: Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/071,489

(22) Filed: Feb. 7, 2002

(65) Prior Publication Data

US 2002/0071352 A1 Jun. 13, 2002

Related U.S. Application Data

(63) Continuation of application No. 09/400,499, filed on Sep. 21, 1999, now Pat. No. 6,385,145.

(51) Int. Cl.[7] .......................... G11B 17/22; G11B 15/68
(52) U.S. Cl. ........................... 369/30.48; 369/30.42; 369/30.43
(58) Field of Search .................... 369/30.38, 30.4, 369/30.41, 30.42, 30.43, 30.45, 30.48, 30.49, 30.63; 360/92, 90.04, 98.06

(56) References Cited

U.S. PATENT DOCUMENTS

| 4,977,532 | A | | 12/1990 | Borkowicz et al. | |
|---|---|---|---|---|---|
| 4,984,106 | A | | 1/1991 | Herger et al. | |
| 5,107,474 | A | | 4/1992 | Ishibashi et al. | |
| 5,255,251 | A | | 10/1993 | Fitzgerald et al. | |
| 5,337,297 | A | * | 8/1994 | Kvifte et al. | ................ 360/92 |
| 5,644,445 | A | | 7/1997 | Ishikawa | |
| 5,761,161 | A | * | 6/1998 | Gallo et al. | .................. 360/92 |
| 5,793,714 | A | | 8/1998 | Inoue et al. | |
| 5,815,340 | A | | 9/1998 | Barkley et al. | |
| 5,856,894 | A | | 1/1999 | Marlowe | |
| 5,870,245 | A | | 2/1999 | Kersey et al. | |
| 5,940,243 | A | | 8/1999 | Kanetsuku et al. | |
| 6,034,928 | A | * | 3/2000 | Inoue | ........................ 360/92 |
| 6,205,093 | B1 | | 3/2001 | Abbott et al. | |
| 6,236,530 | B1 | | 5/2001 | Schneider et al. | |

FOREIGN PATENT DOCUMENTS

| WO | WO 97/17701 | 5/1997 |
|---|---|---|
| WO | WO 98/33113 | 7/1998 |

OTHER PUBLICATIONS

Advanced Digital Information Corporation, DAT Autochanger, Installation And Operating Guide, Aug. 1996, pp. i–viii and pp. 23–34, Chapter 4, U.S.A. 1996.

* cited by examiner

*Primary Examiner*—David L. Ometz
(74) *Attorney, Agent, or Firm*—Wayne P. Bailey

(57) ABSTRACT

The present invention is an automated storage library suitable for rack-mount and desktop installations. Storage media cartridges and a robotic mechanism that transport the storage media cartridges internal to the library are mounted on a moveable drawer. With the drawer at an internal position, the robotic mechanism transports the storage media cartridges between cartridge slots mounted on the drawer and read-write media drives and other cartridge handling devices not mounted on the drawer. The drawer is capable of moving through an opening in the storage library housing to an external position where the storage media cartridges and the robotic mechanism are readily accessible. At the external position, the storage media cartridges can be inserted and removed from the cartridge slots. The drawer may be detachable from the housing to allow unobstructed access to the components housed in the interior of the storage library.

13 Claims, 6 Drawing Sheets

SMALL LIBRARY WORKS-IN-A-DRAWER

CROSS-REFERENCE TO RELATED APPLICATIONS

This application is a continuation of U.S. application Ser. No. 09/400,499 filed Sep. 21, 1999 now U.S. Pat. No. 6,385,145 which is incorporated herein in its entirety.

TECHNICAL FIELD

This invention is related to the field of desktop and rack-mounted libraries that store removable storage media cartridges.

BACKGROUND ART

Small storage libraries are often designed to be mountable in nineteen-inch racks. Rack mounting places several restrictions on the internal layout of the library. For example, routine access to the interior of the library is limited to the front side of the library. Interior access through the library sides is usually blocked by the rack cabinet. Access through the top or bottom sides is often blocked by other equipment mounted in the rack. As a result, small storage libraries requiring only a few storage media cartridges usually position the cartridges in cartridge slots along the front side of the library. From this position the storage media cartridges are readily accessible to a user and their labels can be easily viewed. The cartridge slots are designed to permit storage media cartridge insertion and removal through the side of the cartridge slot facing the user. Side access to the cartridge slots helps keep the height of the library low since no space above or below the cartridge slots is required to accommodate the storage media cartridges or the user's hands. Robotic mechanisms and cartridge handling devices, such as read-write media drives, read-only drives, and transfer ports (a mechanism used to import and export cartridges from the library) do not require routine access thus they are typically positioned in the middle or back of the library. Positioning these devices further back in the library also helps keep their moving machinery out of reach of the user thus reducing the probability of injury.

To increase the capacity of the storage library, the number of storage media cartridges held in the storage library is typically increased. Three different configurations have been used to accommodate additional cartridges within the rack-mount width constraint. In the first configuration, two rows of cartridge slots, one on top of the other, are provided at the front end of the library. Label viewing is accomplished through a window or door at the front of the library. Storage media cartridge insertion and removal are performed through the front side of the cartridge slots. This first configuration, however, requires a tall housing to accommodate the top row of storage media cartridges.

In the second configuration, the additional storage media cartridges are positioned in a second row on the same plane as, and behind the front row of storage media cartridges. An example of this configuration can be seen in U.S. Pat. No. 5,892,750, issued to Barkley et al., on Apr. 6, 1999. Barkley discloses a library having ten cartridges held in a removable magazine positioned at the front of the housing. Five additional cartridges are stored in a back row next to the drive. This approach keeps the library height low, but the second row is hidden behind the first row. The user must rely on the robotic mechanism to carry the desired cartridge between the second row and a "mailbox" at the front of the library. Alternatively, the user must physically remove the front row of storage media cartridges to see and access the cartridges in the second row. Both approaches for reaching the second row are slow, and reliance on the robotic mechanism leaves the storage media cartridges in the second row vulnerable to mechanical and electrical failures.

The third storage library configuration positions all of the storage media cartridges in a row perpendicular to the front of the library. This configuration takes advantage of the greater depth than width of the library to accommodate more storage media cartridges. An example of this configuration is disclosed in U.S. Pat. No. 5,870,245 issued to Kersey et al., on Feb. 9, 1999. Storage media cartridge insertion and removal are typically accomplished using a removable magazine. (Overall, magazines are undesirable for cost, schedule and maintenance reasons.) Labels can only be read while the removable magazine is outside the storage library. After the removable magazine has been installed in the storage library, the user has no direct means to view or access the storage media cartridges.

Positioning the robotic mechanism, cartridge handling devices and other components out of reach and out of sight from the user has advantages from a safety point of view, but has several disadvantages from a maintenance point of view. When the robotic mechanism is hidden from view and it is not operating properly, then the user must remove the housing from the rack and open it to inspect the robotic mechanism. Repair or replacement work that must be performed on any component not positioned near the front of the housing also requires the storage library housing to be removed from the rack and opened. Even if the component is accessible from the front side of the storage library, the user must see and work through a short opening, usually less than seven inches tall.

Another problem facing the user of the small storage library occurs when the robotic mechanism jams a storage media cartridge while trying to insert that cartridge into a cartridge slot or cartridge handling device. The robotic mechanism itself, and other components nearby sometimes makes it impossible to free the jammed storage media cartridge by reaching in from the front of the library. Again, the library must be removed from the rack and the housing opened to provide the necessary clearance to fix the problem.

DISCLOSURE OF INVENTION

The present invention is an automated storage library suitable for rack-mount and desktop installations. Storage media cartridges and a robotic mechanism that transport the storage media cartridges internal to the library are mounted on a moveable drawer. With the drawer at an internal operating position, the robotic mechanism transports the storage media cartridges between cartridge slots mounted on the drawer and read-write media drives and other cartridge handling devices not mounted on the drawer. The drawer is capable of moving through an opening in the storage library housing to an external position. Movement to the external position allows for easy access to the robotic mechanism and all of the storage media cartridges no matter how the storage media cartridges are positioned with respect to the robotic mechanism. Movement to the external position also allows top insertion and removal of the storage media cartridges from the cartridge slots while maintaining a low storage library height. The drawer may be detachable from the housing to allow unobstructed access to the other components positioned in the interior of the storage library.

During normal operations the opening in the housing is covered by a door to prevent human injury by the robotic mechanism. The door may be pivotally attached to the housing or fixed to the drawer. Attaching the door to the housing allows the door to be opened while the robotic mechanism is in motion. During maintenance operations the open door allows the user to watch the robotic mechanism cycle through its tasks.

In another embodiment, the cartridge slots that hold the storage media cartridges are part of a removable magazine attached to the drawer. The magazine allows for rapid installation and removable of several storage media cartridges at a time. A bar code reader may be mounted on the robotic mechanism or the drawer to support automatic inventory of the storage media cartridges.

Accordingly, it is an object of the present invention to provide a storage library where the robotic mechanism and all of the storage media cartridges are mounted on a drawer that is moveable to the exterior of the storage library where they are readily accessible to the user. Preferably, installation and removal of the storage media cartridges are performed through the top of the cartridge slots that hold the storage media cartridges.

Another object of the present invention is to provide a storage library where the front end of the cartridge handling devices are accessible to the user through the front side of the storage library after the robotic mechanism and storage media cartridges have been moved to the exterior of the storage library.

These and other objects, features and advantages will be readily apparent upon consideration of the following detailed description in conjunction with the accompanying drawings.

BEST MODE FOR CARRYING OUT THE INVENTION

Figure 1:
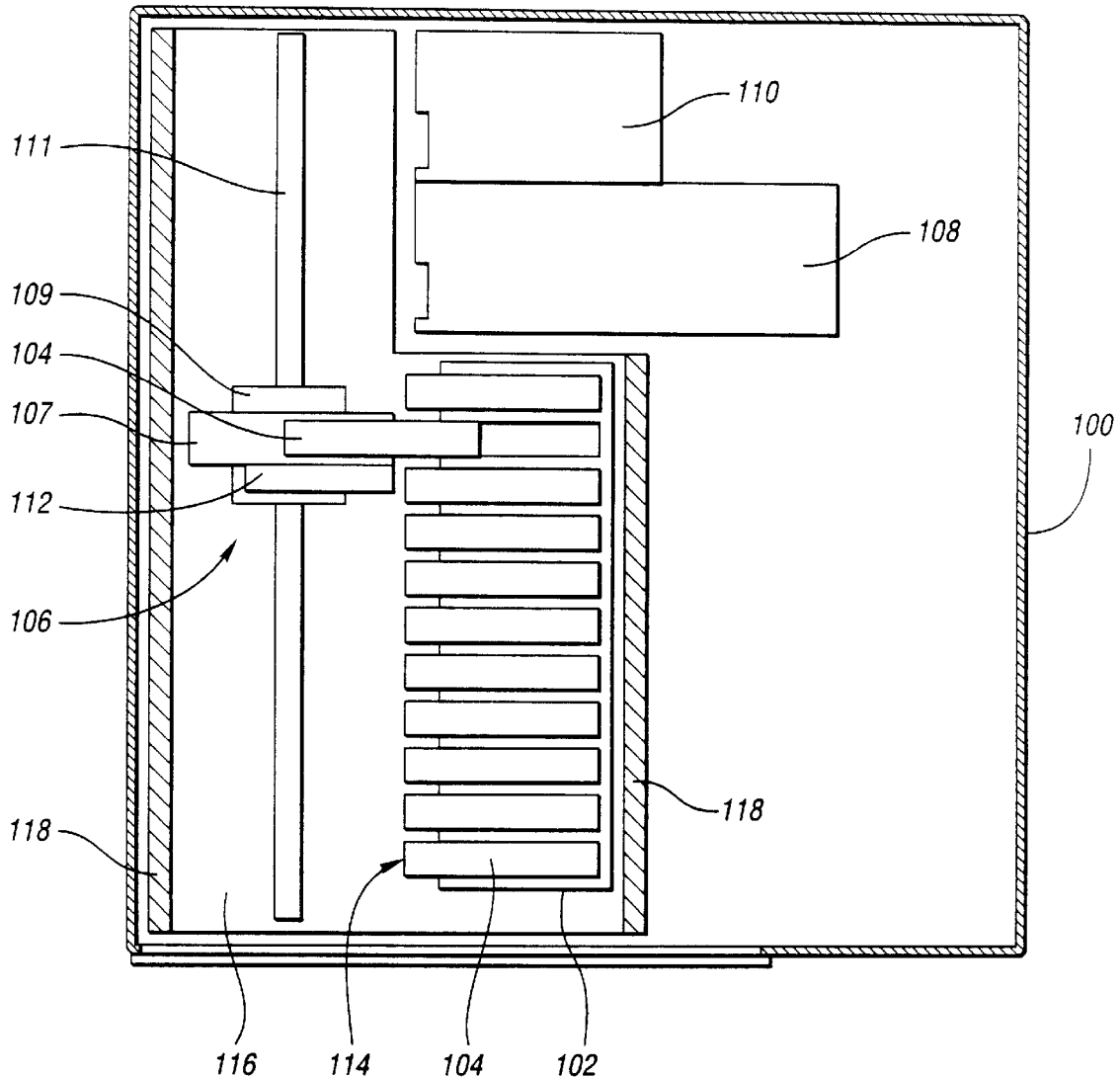
FIG. 1 is a top view of a first embodiment of a storage library implementing the present invention.

A small automated storage library implementing the present invention is shown in FIG. 1. The storage library has as housing 100 that is typically, but not necessarily, nineteen inches (483 millimeters) wide, seven to ten and one half inches (118 to 267 millimeters) tall and twenty-five or more inches (635 millimeters) deep. Inside the housing 100 are multiple cartridge slots 102 used to hold storage media cartridges 104.

A robotic mechanism 106 transports the storage media cartridges 104 between the cartridge slots 102 and cartridge handling devices such as a media drive 108 and a transfer port 110. (For this example and the examples that follow, the robotic mechanism 106 is shown as a picker assembly 107 attached to a linear carriage 109 riding on a track 111. Other variations of the robotic mechanism 106 may be used within the scope of the present invention.) Media drive 108 may be a read-write drive, a read-only drive, or a write-only drive. Transfer port 110 imports and exports one or more storage media cartridges 102 at a time from the library. The robotic mechanism 106 may carry a bar code reader 112 for reading bar codes on the label side 114 of the storage media cartridges 102. The bar code reader 112 supports automatic inventory operations in the library.

Figure 2:
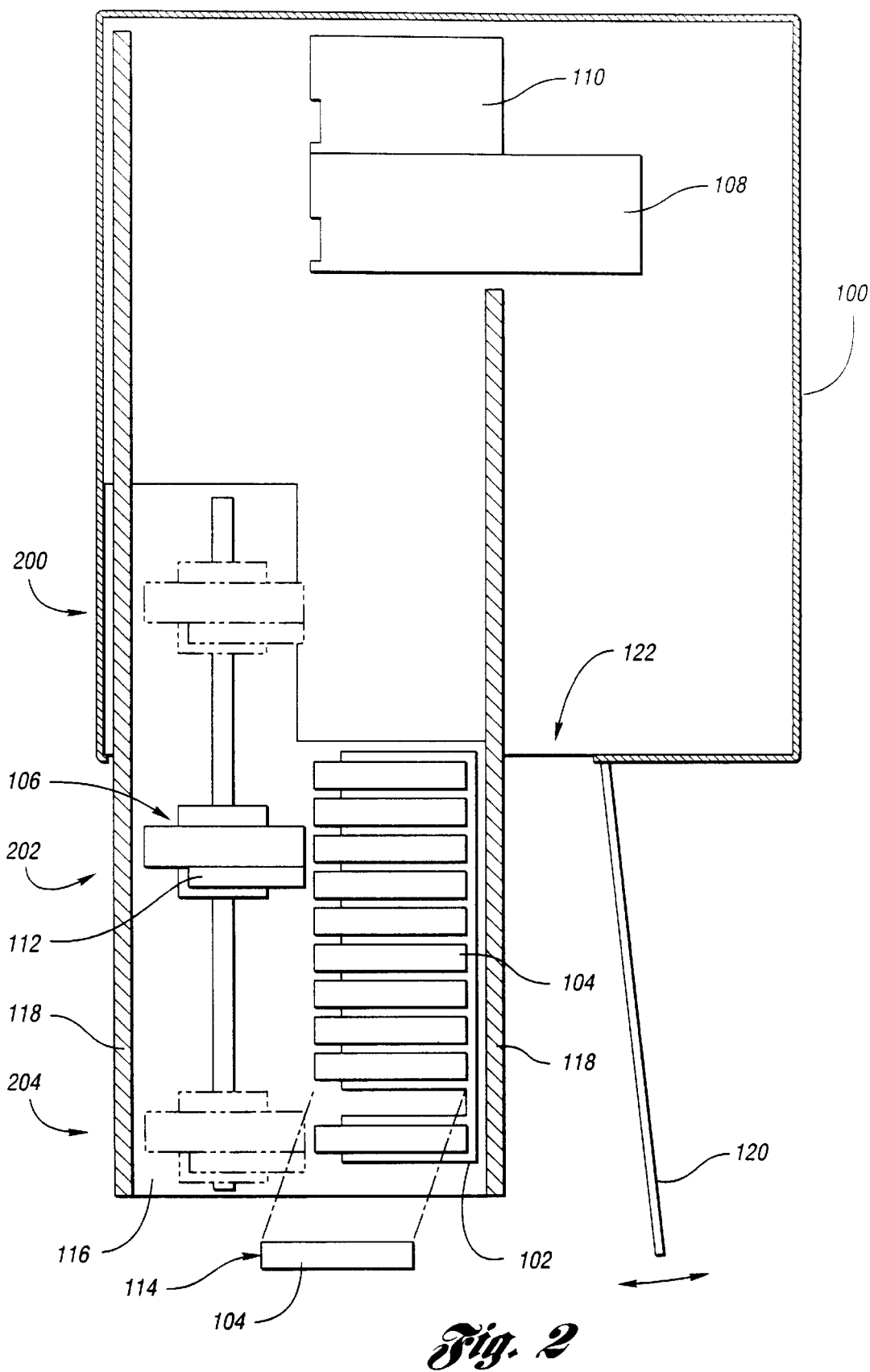
FIG. 2 is a top view of the first embodiment with the drawer at the external position.

In this embodiment, the cartridge slots 102 and the robotic mechanism 106 are mounted on a drawer 116. The drawer 116 in turn, is slidably attached to the housing 100 by two drawer slides 118. The drawer slides 118 allow the drawer 116 to move between and internal position inside the housing 100, as shown in FIG. 1, and an external position, as shown in FIG. 2. Media drive 108 and the transfer port 110 are mounted to the housing 100 so they do not move with the drawer 116. Drawer 116 is shaped to allow the robotic mechanism 106 to align with the media drive 108 and transfer port 110 when the drawer 116 is at the internal position.

FIG. 2 is a top view of the small automated storage library shown in FIG. 1. In this figure the drawer slides 118 are fully extended placing the drawer 116 at the external position. A door 120 covering an opening 122 in the housing 100 swings open to allow the drawer 116, robotic mechanism 106, cartridge slots 102 and the storage media cartridges 104 to slide in and out of the housing 100.

Once the cartridge slots 102 are outside the housing 100, the storage media cartridges 104 are easily inserted and removed from the cartridge slots 102. Insertion and removal of the storage media cartridges 104 may be performed from the side of the cartridge slots 102 or from the top of the cartridge slots 102. Top insertion and removal is the preferred approach because it offers clear access to the storage media cartridges 104. Side insertion and removal must contend with the drawer 116 itself, and possibly the robotic mechanism 106. Since storage media cartridge 104 insertion and removal are performed with the cartridge slots 102 external to the housing 100, the housing size can be kept to a minimum. The housing height and width need only account for when the robotic mechanism 106 inserts and removes the storage media cartridges 104 from the cartridge slots 102. Space around the cartridge slots 102 required by a human user (not shown) to access the storage media cartridges 104 is not necessary when the drawer 116 is in the internal position.

With the drawer 116 at the external position, the robotic mechanism 106 may be positioned at one of several locations for different operations. In situations where the user wishes to handle or view the label side 104 of the storage media cartridges 104, the robotic mechanism 106 may be moved to a rear position 200 (shown in phantom) at the back of the drawer 116 away from the cartridge slots 102. Rear position 200 gives the user an unobstructed view and side access to the storage media cartridges 104. During debugging operations, the robotic mechanism 106 may be moved to an adjacent position next to the cartridge slots 102, as shown as a central position 202. Here, the user may observe the robotic mechanism 106 in action inserting and removing storage media cartridges 104 from the cartridge slots 102, reading the bar-codes on the label sides 114, and traversing from one cartridge slot 102 to another. For maintenance operations, the robotic mechanism 106 may be moved to a front position 204 (shown in phantom) at the edge of the drawer 116 furthest from the housing 100. Front position 204 allows the user good access while repairing, maintaining, and even replacing the robotic mechanism 106.

The drawer 116 may be detachable from the drawer slides 118. This feature is useful for maintenance and production purposes. For example, detaching drawer 116 from the drawer slides 118 clears opening 122 allowing for better access into the housing 100 during maintenance. Field replacements of a failed robotic mechanism 106 can be accomplished by removing the old drawer 116 and installing a new drawer 116 without a major disassembly of the housing 100. Also, the robotic mechanism 106 and cartridge slots 102 mounted on the drawer 116 create an independently testable subassembly in the storage library fabrication process.

Figure 3:
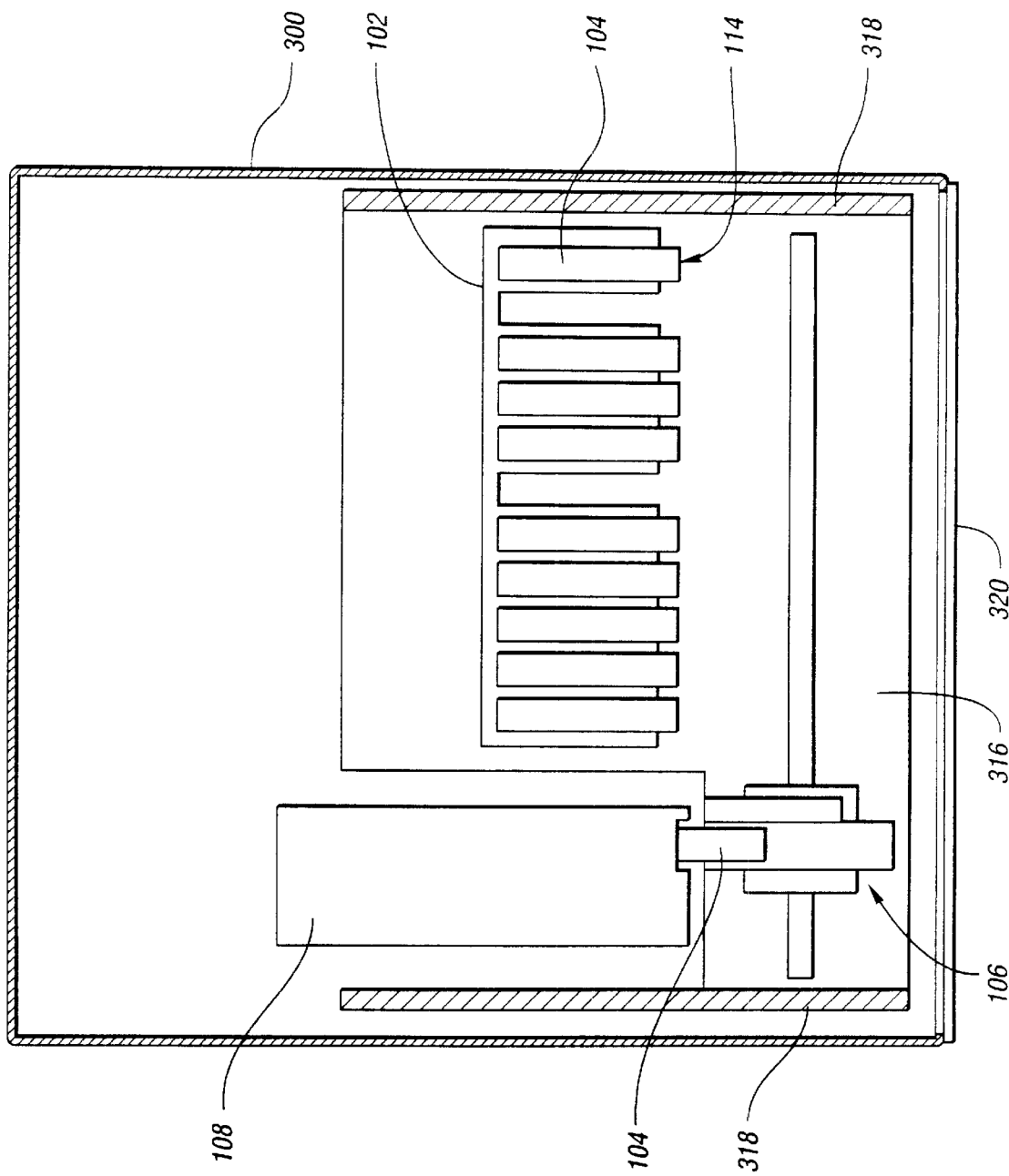
FIG. 3 is a top view of a second embodiment of a storage library.

A second embodiment of a small automated storage library implementing the present invention is shown in FIG. 3. In this configuration, the cartridge slots 102, media drive 108, and robotic mechanism 106 are oriented in rows substantially parallel to the front side of this housing 300. The cartridge slots 102 and robotic mechanism 106 are mounted on drawer 316. Drawer 316 is attached to the housing 300 through drawer slides 318. Additional drawer slides 318 may be included toward the left-to-right center of the drawer 316 as necessary for support. Media drive 108 is mounted to the housing 300. With the drawer 316 at the interior, or normal operating position, as shown in FIG. 3, the robotic mechanism 106 has access to the media drive 108. With the drawer 316 at the exterior position, the user has easy access to the storage media cartridges 104 and the robotic mechanism 106. One advantage of the configuration shown in FIG. 3 over that shown in FIG. 1 is that opening the door 320 gives the user an unobstructed path to the front side of the media drive 108. With this access, the user can mount cleaning cartridges in the media drive 108, and view any indicators and select any controls available on the front side of the media drive 108. Another advantage of the configuration shown in FIG. 3 is that the label side 114 of all of the storage media cartridges 104 are viewable with the drawer 316 in the interior position.

Figure 4:
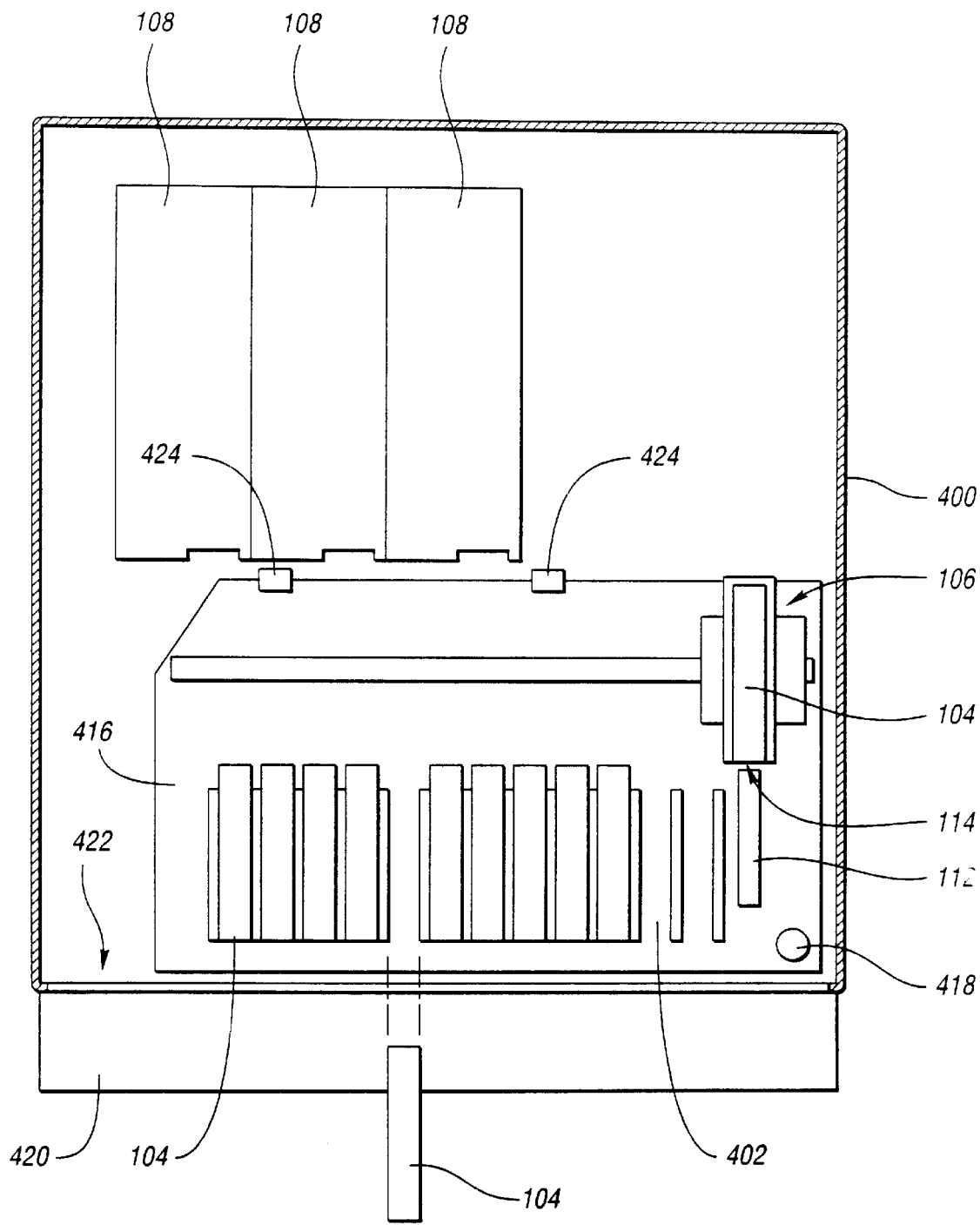
FIG. 4 is a top view of a third embodiment of a storage library.
Figure 5:
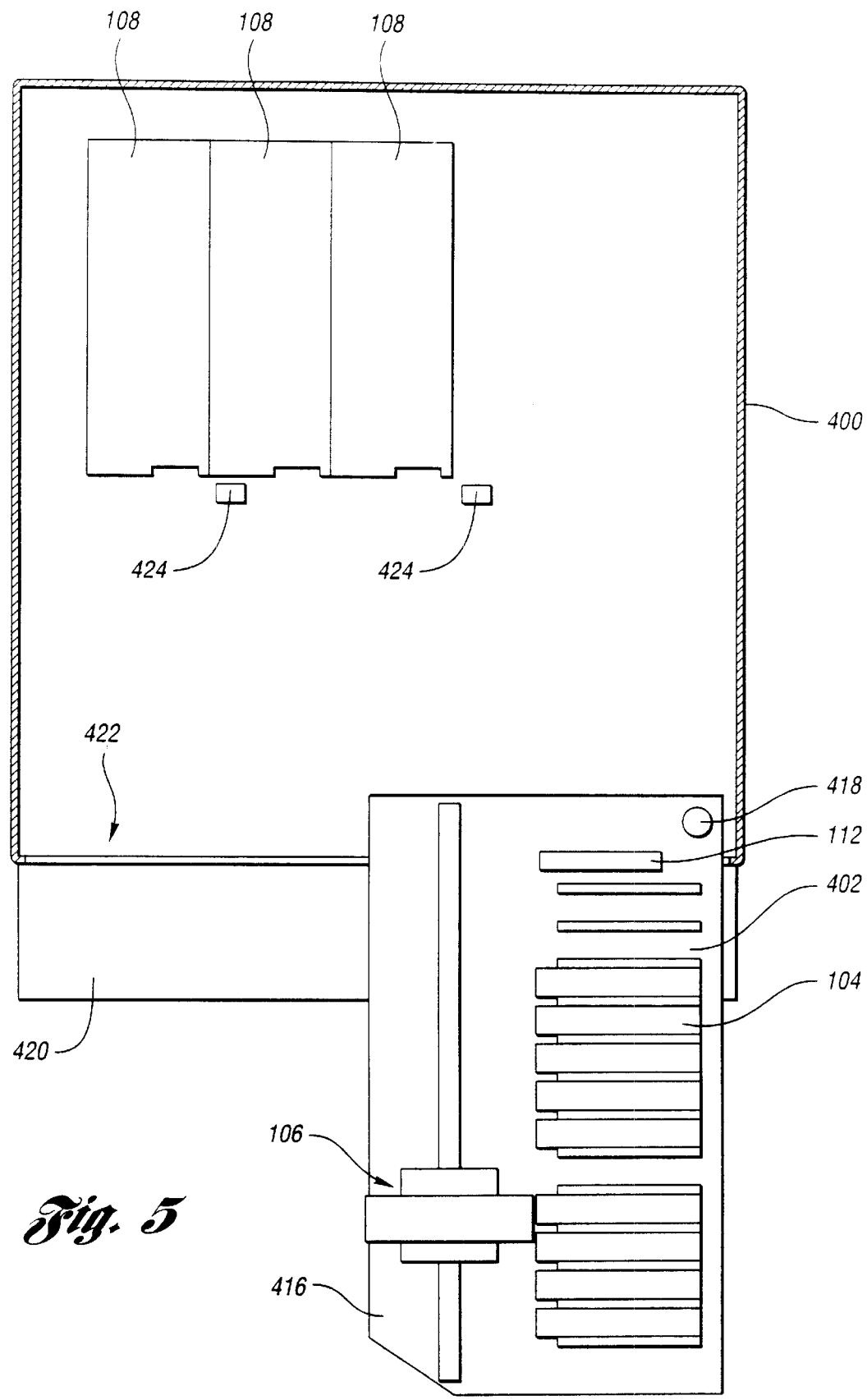
FIG. 5 is a top view of the third embodiment with the drawer at the external position.

A third embodiment of the present invention with the drawer 416 at the internal and external positions are shown in FIG. 4 and FIG. 5 respectively. Several variations are shown in FIG. 4 and FIG. 5 as compared with the examples shown in FIG. 1, FIG. 2 and FIG. 3. Instead of moving linearly on drawer slides as in the first two embodiment, the drawer 416 in the third embodiment rotates horizontally on a bearing 418 between the internal position shown in FIG. 4 and the external position shown in FIG. 5. One or more mechanical guides 424 may be provided to position and support the drawer 416 when the drawer is at the interior, or operating position. Next, the door 420 in the third embodiment opens downward, instead of to the side as in the first embodiment shown in FIG. 2. The cartridge slots 402 of the third embodiment allow for insertion and removal of the storage media cartridges 104 from two sides, one side for accessibility by the robotic mechanism and the other side for accessibility by the user. This feature allows the user to insert and remove the storage media cartridges 104 with the drawer 416 at both the internal position and the external position. Finally, the drawer 416 in the third embodiment holds more than just the cartridge slots 402 and robotic mechanism 416. Since the label sides 114 of the storage media cartridges 104 face away from the robotic mechanism 106, the bar code reader 112 is attached to the drawer 416 beside the cartridge slots 402.

Referring to FIG. 5, a benefit of rotating the drawer 416 to the exterior position through the opening 422 is that one side of the opening 422 becomes unobstructed by the drawer 416, robotic mechanism 106 or cartridge slots 402. This provides the user room to reach other components inside the housing 400 such as the media drives 108.

Figure 6:
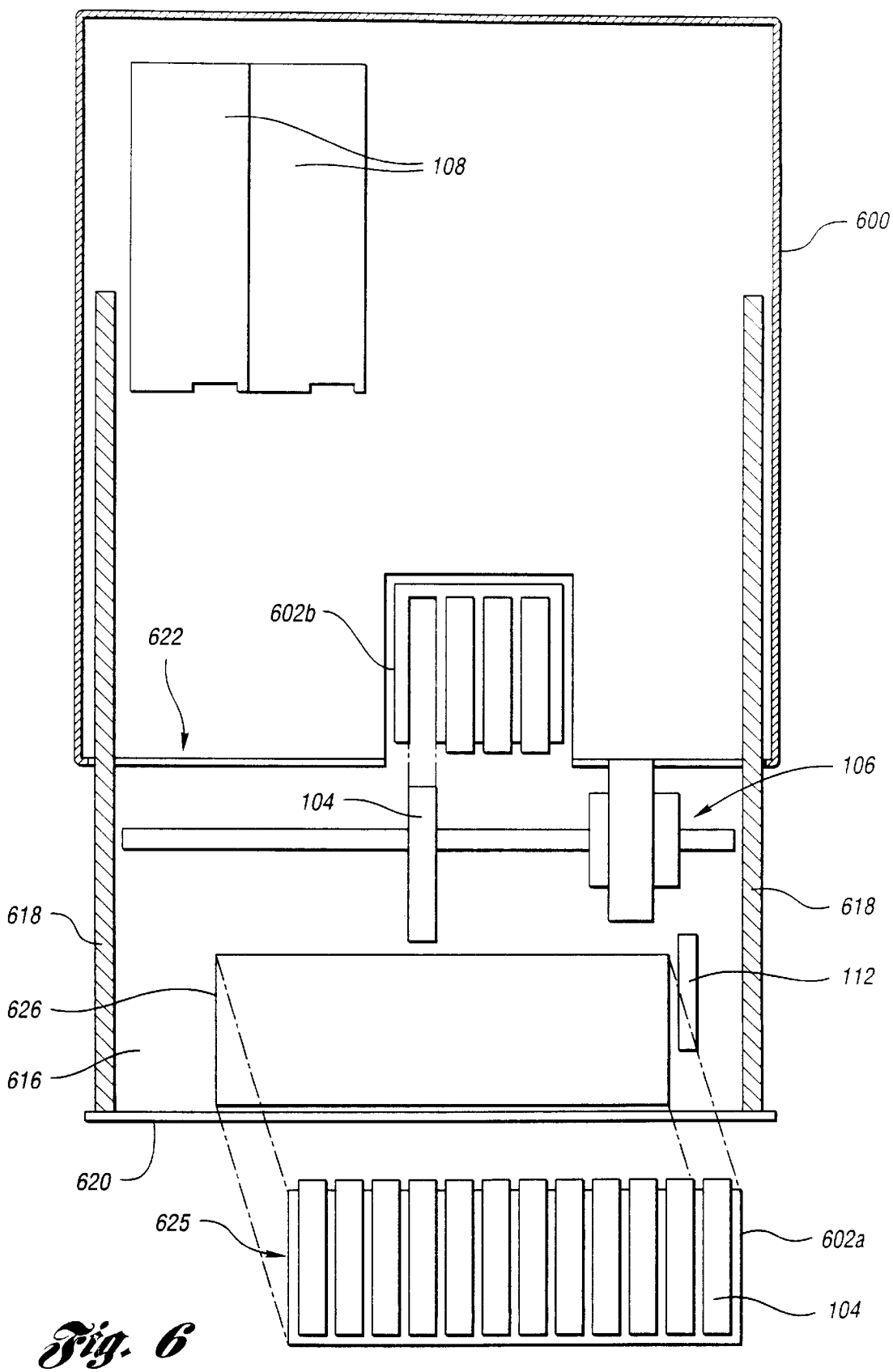
FIG. 6 is a top view of a fourth embodiment of a storage library including a removable magazine.

FIG. 6 shows a fourth embodiment of the present invention with the drawer 616 at the exterior position. In this fourth embodiment there are two sets of cartridge slots, a front set of cartridge slots 602a and a back set of cartridge slots 602b. The front set of cartridge slots 602a form a removable magazine 625. A magazine socket 626 provided on the drawer 616 demountably receives the removable magazine 625 on the drawer 616. The back set of cartridge slots 602b may be permanently attached to the drawer 616. The door 620 is attached to the drawer 616 and is movable therewith.

Note that the back set of cartridge slots 602b remain inside the housing 600 when the drawer 616 is at the exterior position, as shown in FIG. 6. This shows a case where the drawer 616 is used to move the back set of cartridge slots 602b to the front of the housing 600 where they can be reached. While it is preferred, moving all of the cartridge slots 602a–b to the exterior of the housing 600 is not always necessary. With the back set of cartridge slots 602b at or near the opening 622, the user can insert and remove storage media cartridges 104 from the back set of cartridge slots 602b from the same direction that the robotic mechanism 106 inserts and removes the storage media cartridges 104. Using longer drawer slides 618, the back set of cartridge slots 602b could be brought all of the way out of the housing 600 where the user could insert and remove the storage media cartridges 104 through the tops of the back set of cartridge slots 602b.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A storage library for storing a plurality of storage media cartridges, the storage library comprising:

a housing having an opening;

at least one media drive disposed inside the housing;

a drawer moveably connected to the housing, the drawer having an internal position inside the housing, and operative to be moved through the opening of the housing to an external position;

a plurality of cartridge slots disposed on the drawer for holding the plurality of storage media cartridges; and a robotic mechanism disposed on the drawer and operative to move the plurality of storage media cartridges one at a time between the plurality of cartridge slots and the at least one media drive.

2. The storage library of claim 1 wherein the drawer is detachable from the housing.

3. The storage library of claim 1 further comprising at least one drawer slide moveably connecting the drawer to the housing, the at least one drawer slide permitting the drawer to be moved between the interior position and the exterior position.

4. The storage library of claim 1 wherein at least one storage media cartridge of the plurality of storage media cartridges has a bar code, the storage library further comprising a bar code reader disposed on the robotic mechanism and operative to read the bar code of the at least one storage media cartridge.

5. The storage library of claim 1 further comprising a door operative to cover the opening in the housing, the door being pivotally attached to the housing.

6. The storage library of claim 1 further comprising a door operative to cover the opening in the housing, the door being attached to the drawer.

7. A storage library for storing a plurality of storage media cartridges, the storage library comprising:
   a housing having an opening;
   at least one cartridge handling device disposed inside the housing, wherein the at least one cartridge handling device is at least one media drive operable to record information on and retrieve information from the plurality of storage media cartridges;
   a drawer moveably connected to the housing, the drawer having an internal position inside the housing, and operative to be moved through the opening of the housing to an external position;
   a plurality of cartridge slots disposed on the drawer for holding the plurality of storage media cartridges; and
   a robotic mechanism disposed on the drawer and operative to move the plurality of storage media cartridges one at a time between the plurality of cartridge slots and the at least one cartridge handling device.

8. A storage library for storing a plurality of storage media cartridges, the storage library comprising:
   a housing having an opening;
   at least one cartridge handling device disposed inside the housing;
   a drawer moveably connected to the housing, the drawer having an internal position inside the housing, and operative to be moved through the opening of the housing to an external position;
   a plurality of cartridge slots disposed on the drawer for holding the plurality of storage media cartridges, wherein the plurality of cartridge slots form at least one magazine, the storage library further comprising at least one magazine socket provided on the drawer for demountably coupling the at least one magazine to the drawer; and
   a robotic mechanism disposed on the drawer and operative to move the plurality of storage media cartridges one at a time between the plurality of cartridge slots and the at least one cartridge handling device.

9. A storage library for storing a plurality of storage media cartridges, the storage library comprising a robotic mechanism disposed on a drawer, the robotic mechanism directly moving the plurality of storage media cartridges between at least one cartridge slot on the drawer and at least one media drive located within the storage library, the drawer operative to pass at least partially through an opening in the storage library.

10. A method of handling media cartridges comprising:
    opening a drawer to bring a robotic mechanism from within a housing to outside of the housing;
    inserting a media cartridge into a cartridge slot mounted on the drawer; and
    closing the drawer to permit the robotic mechanism to load the media cartridge directly from the cartridge slot to a media drive located within the housing.

11. A method of handling media cartridges as in claim 10 wherein opening the drawer comprises sliding the drawer along at least one drawer slide.

12. A method of accessing a media drive in a storage library comprising moving at least a portion of a drawer through an opening in the storage library, the drawer containing a robotic mechanism for directly loading media cartridges from the drawer into the media drive, thereby providing an unobstructed path through the opening to the media drive.

13. A method of accessing a cartridge handling device as in claim 12 wherein the drawer travels linearly along slides.

* * * * *